(12) United States Patent
Fujita

(10) Patent No.: US 8,865,026 B2
(45) Date of Patent: Oct. 21, 2014

(54) THERMOSETTING ADHESIVE

(71) Applicant: Sony Chemical & Information Device Corporation, Tokyo (JP)

(72) Inventor: Yasuhiro Fujita, Tochigi (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 13/732,771

(22) Filed: Jan. 2, 2013

(65) Prior Publication Data

US 2013/0126789 A1 May 23, 2013

Related U.S. Application Data

(62) Division of application No. 12/223,298, filed as application No. PCT/JP2006/323567 on Nov. 27, 2006, now abandoned.

(30) Foreign Application Priority Data

Feb. 3, 2006 (JP) ................................. 2006-026641

(51) Int. Cl.
| | | |
|---|---|---|
| C09J 163/00 | (2006.01) | |
| H01B 1/22 | (2006.01) | |
| C09J 11/06 | (2006.01) | |
| H01R 4/04 | (2006.01) | |
| C08K 5/00 | (2006.01) | |

(52) U.S. Cl.
CPC . *C09J 11/06* (2013.01); *H01B 1/22* (2013.01); *H01R 4/04* (2013.01); *C08K 5/0025* (2013.01); *C09J 163/00* (2013.01)
USPC ........... 252/500; 523/400; 523/454; 523/451; 523/453

(58) Field of Classification Search
USPC ........................................................ 524/129
See application file for complete search history.

(56) References Cited

U.S. PATENT DOCUMENTS

| | | | |
|---|---|---|---|
| 5,423,931 A | 6/1995 | Inoue et al. | |
| 6,165,386 A * | 12/2000 | Endo et al. | ..................... 252/500 |
| 6,452,111 B1 * | 9/2002 | Kumakura | ..................... 174/259 |
| 6,749,994 B2 | 6/2004 | Oshio et al. | |
| 2003/0019576 A1 | 1/2003 | Torres-Filho et al. | |
| 2005/0130391 A1 | 6/2005 | Takayama et al. | |
| 2005/0244752 A1 * | 11/2005 | Yoshizawa et al. | ...... 430/270.12 |

FOREIGN PATENT DOCUMENTS

| | | |
|---|---|---|
| JP | A-05-209153 | 8/1993 |
| JP | A-06-103819 | 4/1994 |
| JP | A-06-240108 | 8/1994 |
| JP | A-06-295617 | 10/1994 |
| JP | A-11-191320 | 7/1999 |

OTHER PUBLICATIONS

Sep. 14, 2011 Notification of Reasons for Refusal issued in Japanese Application No. 2006-026641 with English-language translation.
Japanese Office Action dated Apr. 26, 2012 for Japanese Patent Application No. 2006-026641 (with translation).

* cited by examiner

Primary Examiner — Doris Lee
(74) Attorney, Agent, or Firm — Oliff PLC

(57) ABSTRACT

A thermosetting adhesive is configured to include a photoradical generator which generates radicals from irradiation of active energy rays in a thermosetting insulating adhesive component. In a repair method when this thermosetting adhesive is used, a cured matter of the thermosetting adhesive is made soluble or swellable in a predetermined solvent by irradiating the cured matter with active energy rays from the substrate side or the electronic component side prior to separating the electronic component from the substrate, and the cured matter is removed using such solvent. Alternatively, the cured matter of the thermosetting adhesive is made soluble or swellable in a predetermined solvent by irradiating the cured matter with active energy rays after the electronic component has been separated from the substrate, and the cured matter is removed using such solvent.

9 Claims, No Drawings

US 8,865,026 B2

THERMOSETTING ADHESIVE

This is a Division of application Ser. No. 12/223,298 filed Jul. 28, 2008, which in turn is a National Phase of Application No. PCT/JP2006/323567 filed Nov. 27, 2006. The disclosure of the prior applications is hereby incorporated by reference herein in its entirety.

TECHNICAL FIELD

The present invention relates to a thermosetting adhesive comprising a thermosetting insulating adhesive component, and preferably to a thermosetting adhesive which further contains anisotropic conductive particles and which is useful as an anisotropic conductive adhesive. More particularly, the present invention relates to a thermosetting adhesive such that repair can be easily conducted even after an electronic component is compression-bonded on a substrate.

BACKGROUND ART

Anisotropic conductive adhesives are used for compression-bonding various kinds of electronic components on various substrates. However, when an electronic component is compression-bonded on a substrate using an anisotropic conductive adhesive, on rare occasions a disconnection occurs due to misalignment in the position of the electronic component after being compression-bonded, defects in the curing of the anisotropic conductive adhesive and the like. In such cases, if the material costs are low, the materials are discarded. However, when very expensive liquid crystal panel substrates, logic board substrates and the like are used for the substrate, to prevent an increase in production costs and to improve yield, repair work is carried out so that the liquid crystal panel substrate or logic board substrate can be reused.

For conventional repair work of a substrate on which an electronic component has been compression-bonded by an anisotropic conductive adhesive, the following methods have been proposed: (1) peeling the electronic component from the substrate and scraping away by hand the adhesive attached to the substrate with a cotton swab or brush soaked with a solvent; (2) arranging a thermoplastic resin layer on one side of an anisotropic conductive film, softening the thermoplastic resin layer by heating, and then peeling off the electronic component (Patent Document 1); and (3) blending a radical initiator and the like in a radical-polymerizable adhesive matrix resin, temporarily fixing an electronic component to the substrate with the adhesive matrix resin, and if there is a problem in that state, peeling off the electronic component, and if there are no problems in that state, starting a radical polymerization reaction by heating (Patent Document 2).

Patent Document 1: Japanese Patent Application Laid-Open No. Hei 6-103819
Patent Document 2: Japanese Patent Application Laid-Open No. Hei 6-295617

DISCLOSURE OF THE INVENTION

Problems to be Solved by the Invention

However, with the above-described method (1), there is the problem that labor costs and time become excessive, and with the method (2), there is the problem of having insufficient conduction reliability, since not all of the adhesive is cured, there is a risk of dimensional changes and positional misalignment occurring from the heat. With the method (3), there is the problem that because two extra steps are required, the temporary fixing step and the curing step, in addition to the repair step, the process becomes complex, which inevitably also leads to an increase in production costs. Furthermore, in situations where it is necessary to carry out repairs after the curing step, since curing has already been carried out, there are the same problems as with the method (1). These problems also occur for insulating adhesives used in similar circumstances.

It is an object of the present invention to resolve the above conventional technical problems. The present invention provides a thermosetting adhesive, such as an anisotropic conductive adhesive and the like, which can be easily repaired in cases where an electronic component has been compression-bonded on a substrate using a thermosetting adhesive such as an anisotropic conductive adhesive, an insulating adhesive and the like.

Means for Solving the Problems

The present inventor discovered that for a substrate and an electronic component which are thermally compression-bonded using a thermosetting adhesive blended with a photoradical generator which generates radicals due to irradiation of active energy rays, if the thermosetting adhesive is cured, and then the cured matter is subjected to photoirradiation, the photoradical generator generates radicals, and these radicals, or peroxide radicals formed by those radicals further reacting with oxygen, cause a molecular cleavage reaction of the polymer in the cured matter to occur. This makes the cured matter easily soluble or swellable in a predetermined solvent, whereby the repair work is made easier, thereby arriving at the present invention.

Specifically, the present invention provides a thermosetting adhesive comprising: a thermosetting insulating adhesive component; and a photoradical generator which generates radicals due to irradiation of active energy rays.

Furthermore, the present invention provides a repair method for enabling a substrate and/or an electronic component to be reused by separating the electronic component from the substrate of a connecting structure on which the substrate and the electronic component are connected by thermal compression-bonding with an adhesive, and removing the adhesive attached to the substrate and/or electronic component. The repair method is characterized by: using the thermosetting adhesive according to any of claims 1 to 10 as an adhesive; irradiating a cured matter of the thermosetting adhesive with active energy rays from the substrate side or the electronic component side prior to separating the electronic component from the substrate, to make the cured matter soluble or swellable in a predetermined solvent; and removing the cured matter using the solvent: or by using the thermosetting adhesive according to any of claims 1 to 10 as an adhesive; irradiating a cured matter of the thermosetting adhesive with active energy rays after the electronic component has been separated from the substrate, to make the cured matter soluble or swellable in a predetermined solvent; and removing the cured matter using the solvent.

Effect of the Invention

Since the thermosetting adhesive, such as an anisotropic conductive adhesive, according to the present invention is a thermosetting type, the substrate and the electronic component can be reliably connected by providing the adhesive therebetween and thermally compression-bonding. Furthermore, since a photoradical generator is included, if active energy rays are irradiated on the cured matter of the thermosetting adhesive after the thermal curing, the generated radicals cause a molecular cleavage reaction of the polymer in the cured matter to occur. Accordingly, the thermosetting adhesive is more easily dissolved or swollen by a solvent even though it has been thermally cured, which makes the repair work easy.

BEST MODE FOR CARRYING OUT THE INVENTION

The thermosetting adhesive according to the present invention includes a thermosetting insulating adhesive component and a photoradical generator which generates photoradicals due to irradiation of active energy rays.

As the photoradical generator used in the present invention, conventionally-known photoradical generators can be used which as a principle do not generate radicals from heating during thermal compression-bonding, but do generate radicals due to irradiation of active energy rays such as visible light, ultraviolet rays, electron beams, X-rays and the like. Examples thereof include benzyldimethylketal compounds, such as 2,2-dimethoxy-1,2-diphenylethan-1-one; α-hydroxy ketone compounds, such as 1-hydroxy-cyclohexyl-phenyl ketone and 2-hydroxy-2-methyl-1-phenyl-propan-1-one; bisacylphosphine oxide compounds, such as bis(2,4,6-trimethylbenzoyl)-phenylphosphine oxide; α-amino ketone compounds, such as 2-benzyl-2-dimethylamino-1-(4-morpholinophenyl)-butan-1-one and 2-methyl-1-[4-(methylthio)phenyl]-2-morpholinopropan-1-one; and the like. To improve the effects of the present invention, such a photoradical generator can be used together with an aid, for example, a photosensitizer such as an aliphatic amine or an aromatic amine and the like.

If the amount of the photoradical generator in the thermosetting adhesive is too small, the cleaving of the molecular chain of the polymer in the cured matter of the thermosetting adhesive is insufficient, while if the amount is too large, adhesion and conduction reliability of the thermosetting adhesive deteriorates. Thus, the amount of the thermosetting adhesive (excluding solvent) is preferably in the range of from 0.001 wt. % to 20 wt. %, and more preferably in the range of from 0.01 wt. % to 10 wt. %.

Thermosetting insulating adhesive components which are used in conventional anisotropic conductive adhesives may be used for the thermosetting insulating adhesive component corresponding to the binder of the thermosetting adhesive according to the present invention. Examples of such thermosetting insulating adhesive components include: the main resin component of thermosetting epoxy resins, phenoxy resins, oxetane resins and the like, which do not have a carbon-carbon double bond which is polymerized due to radicals generated by a photoradical generator, and are unreactive to radical polymerization of various resins, oligomers and the like having a functional group (e.g., epoxy group, oxetane group etc.) which crosslinks by a curing agent; imidazole latent curing agents which induce a curing reaction due to heat during thermal compression-bonding; latent curing agents such as amine latent curing agents and the like; coupling agents such as silane coupling agents; thermoplastic elastomers such as acrylic rubber; and the like. The blended amount of these is not especially limited, and generally may be, based on 100 parts by weight of the main resin component, 1 part by weight to 100 parts by weight of latent curing agent, 0.1 parts by weight to 10 parts by weight of silane coupling agent, and 0 parts by weight to 50 parts by weight of thermoplastic elastomer. Among these, from the standpoint of ensuring conduction reliability, the use of an epoxy resin and/or a phenoxy resin for the main resin component is preferred.

Furthermore, the thermosetting adhesive according to the present invention can be used as an anisotropic conductive adhesive by blending with conductive particles for anisotropic conductive adhesion. Conductive particles used in conventional anisotropic conductive adhesives can be used as such conductive particles for anisotropic conductive adhesion. Examples thereof include metal or alloy particles of gold, nickel, solder and the like having a diameter of 1 μm to 10 μm, metal- or alloy-coated resin particles having a thin film of such metals formed on the surface of resin particles, as well as insulating coated conductive particles having an insulating thin film formed on the surface such particles.

If the amount of thermosetting adhesive (excluding solvent) blended in the conductive particles for anisotropic conductive adhesion is too low, conduction reliability is insufficient, while if the amount is too large, there is a risk of short circuiting. Therefore, the blended amount is preferably in the range of from 0.5 wt. % to 70 wt. %, and more preferably in the range of from 3 wt. % to 40 wt. %.

The thermosetting adhesive according to the present invention may contain a solvent, a ketone, an alcohol, toluene and the like as required. The amount used may be appropriately determined according to the application method onto the connecting portion of the thermosetting adhesive and the like.

The form of the thermosetting adhesive according to the present invention may be as a paste formed by an ordinary method, or formed as a film. For example, in the case of forming the thermosetting adhesive according to the present invention as a paste, the paste may be prepared by uniformly mixing by an ordinary method a main resin component, a latent curing agent, a photoradical generator, and further as required, a coupling agent, a thermoplastic elastomer and a solvent. In the case of forming as a film, the film can be produced by diluting with a solvent to a viscosity suitable for coating, and then employing a method such as roll coating, comma coating and the like to form the film.

The repair method according to the present invention enables substrates and/or electronic components to be reused by peeling an electronic component from a substrate by machine or by hand so as to separate the electronic component from a connecting structure, in which a substrate, such as a liquid crystal panel substrate, a logic board and the like, and a liquid crystal electronic component, such as an IC chip, a flexible circuit board and the like, are connected by thermal compression-bonding with a thermosetting adhesive, and removing the thermosetting adhesive attached to the substrate and/or electronic component. In the present repair method, the above-described thermosetting adhesive according to the present invention which contains a photoradical generator is used as the thermosetting adhesive.

In the repair method according to the present invention, although cured matter of the thermosetting adhesive are irradiated with active energy rays, it is preferred to employ a specific sequence which depends on the level of the transparency of the active energy rays to the substrate or electronic component. For example, when using a liquid crystal panel glass substrate or the like which active energy rays such as visible light or ultraviolet rays pass through, the active energy ray irradiation is carried out on the cured matter of the thermosetting adhesive sandwiched between the electronic component and the substrate from the substrate side or the electronic component side through which the active energy rays can pass before separating the electronic component from the substrate. As a result, the cured matter of the thermosetting adhesive is made soluble or swellable in a predetermined solvent, whereby the cured matter can be removed using the solvent. In this instance, when removing the cured matter of the thermosetting adhesive using the solvent, this step can be carried out by, after carrying out photoirradiation, peeling the electronic component from the substrate by machine or by hand so as to separate them, and dipping the substrate or electronic component to which cured matter of the thermosetting adhesive is attached in the solvent, or scraping with a cotton swab or brush soaked with the solvent.

In addition to cases where either the substrate or the electronic component is transparent to active energy rays, especially when neither the substrate nor the electronic component are transparent to active energy rays, by carrying out the active energy ray irradiation on the cured matter of the exposed thermosetting adhesive after the electronic component has been separated from the substrate, the cured matter is made soluble or swellable in the solvent. In this way, the cured matter can be removed using the solvent. At this stage, the solvent can be brought into contact with the cured matter of the exposed thermosetting adhesive by pre-supplying the solvent prior to photoirradiation with a coating sprayer, a brush, a dropper or the like, or brought into contact therewith by supplying it after the photoirradiation.

In the repair method according to the present invention, although the solvent depends on the composition and the like of the thermosetting adhesive, preferred examples typically include pure solvents free from dissolved substances (such as acetone and acetamide solvents (e.g., acetamide, N,N-dimethylacetamide etc.)). Furthermore, so long as the effects of the present invention are not harmed, various kinds of solvent (cation-generating salt solutions, such as sulfonium salt solution, oxonium salt solution etc.) may be used as the solvent in the repair method according to the present invention.

Among these, when using a cation-generating salt solution, it is preferred to apply the cation-generating salt solution on the cured matter of the exposed thermosetting adhesive and then carry out the active energy ray irradiation after the electronic component has been separated from the substrate. This allows a dramatic reduction in the number of scrapings to be achieved. While the reason for this is not clear, it is thought that this may be due to the cations generated from the cation-generating salt promoting the cleavage of the molecular chain of the cured matter of the thermosetting adhesive. Specific examples of such a cation-generating salt solution include Sunaid SI80L (manufactured by Sanshin Chemical Industry Co., Ltd.) and the like.

Furthermore, when using an acetamide solvent, it is preferred to apply the acetamide on the cured matter of the exposed thermosetting adhesive and then carry out the active energy ray irradiation after the electronic component has been separated from the substrate. This allows a dramatic reduction in the number of scrapings to be achieved. While the reason for this is not clear, it is thought that this may be due to the fact that acetamide solvents have a high dissolving power, and yet radicals are generated due to the irradiation of ultraviolet rays, which promotes the cleavage of the molecular chain of the cured matter of the thermosetting adhesive.

By using the thermosetting adhesive and the repair method according to the present invention, a method for producing a connecting structure having a step of determining whether repair is necessary can be realized.

EXAMPLES

The present invention will now be described in more detail by the following examples.

Example 1

40 parts by weight of a bisphenol A type epoxy resin (Epicoat 828, manufactured by Japan Epoxy Resins Co., Ltd.), 30 parts by weight of phenoxy resin (Pheno Tohto YP50, manufactured by Tohto Kasei Co., Ltd.), 10 parts by weight of acrylic rubber (Raisan #1500, manufactured by Nagase ChemteX Corporation), 20 parts by weight of latent curing agent (HX3941HP, manufactured by Asahi Kasei Corporation), 5 parts by weight of 4 μm-diameter Ni/Au plated resin particles (Micropearl Au, manufactured by Sekisui Chemical Co. Ltd.), 1 part by weight of silane coupling agent (A187, manufactured by Nippon Unicar Company Limited) and 2 parts by weight of acylphosphine oxide photoradical generator (Irgacure 819, manufactured by Ciba Specialty Chemicals) were mixed uniformly in toluene. The obtained mixture was coated to a dry thickness of 20 μm on a release-treated surface of polyethylene terephthalate (P-WPETA-07-50, manufactured by Tohcello Co., Ltd.) which had undergone a release treatment, and the resultant coating was then dried for 5 minutes at 70° C. to obtain an anisotropic conductive film.

The obtained anisotropic conductive film was sandwiched between the ITO electrode of a glass substrate on which an ITO electrode terminal was provided and the copper foil pattern terminal of a polyimide flexible substrate formed with a copper foil pattern terminal, and then compression-bonded for 10 seconds at a pressure of 40 MPa at 190° C. to obtain a layered connecting body.

Next, the cured anisotropic conductive film was irradiated with ultraviolet rays (40 mJ) of a high-pressure mercury lamp (Curemax 210P, manufactured by Oomiya Kasei Corporation) from the glass substrate side of the obtained layered connecting body. Then, the flexible substrate was peeled by hand from the glass substrate, and the cured anisotropic conductive film attached to the glass substrate was scraped off with a cotton swab soaked in acetone until there was none left. The number of scrapings was counted. The obtained results are shown in Table 1.

Example 2

An anisotropic conductive film was obtained by repeating the same operations of Example 1, except that 2 parts by weight of α-hydroxy ketone photoradical generator (Irgacure 184, manufactured by Ciba Speciality Chemicals) were used instead of the acylphosphine oxide photoradical generator.

The obtained anisotropic conductive film was sandwiched between the copper pattern of a glass epoxy circuit board on which a copper pattern terminal was provided and the copper foil pattern terminal of a polyimide flexible substrate formed with a copper foil pattern terminal, and then compression-bonded for 10 seconds at a pressure of 40 MPa at 190° C. to obtain a layered connecting body.

Next, the flexible substrate was peeled by hand from the glass epoxy substrate of the obtained layered connecting body, and the cured anisotropic conductive film attached to the glass epoxy substrate was irradiated with ultraviolet rays (40 mJ) of a high-pressure mercury lamp (Curemax 210P, manufactured by Oomiya Kasei Corporation). Then, the cured anisotropic conductive film attached to the glass epoxy substrate was scraped off with a cotton swab soaked in acetone until there was none left. The number of scrapings was counted. The obtained results are shown in Table 1.

Example 3

An anisotropic conductive film was obtained by repeating the same operations of Example 2, except that 0.1 parts by weight of α-hydroxy ketone photoradical generator were used.

The obtained anisotropic conductive film was sandwiched between the copper pattern of a glass epoxy circuit board on which a copper pattern terminal was provided and the copper foil pattern terminal of a polyimide flexible substrate formed with a copper foil pattern terminal, and then compression-bonded for 10 seconds at a pressure of 40 MPa at 190° C. to obtain a layered connecting body.

Next, the flexible substrate was peeled by hand from the glass epoxy substrate of the obtained layered connecting body, and the cured anisotropic conductive film attached to the glass epoxy substrate was irradiated with ultraviolet rays (40 mJ) of a high-pressure mercury lamp (Curemax 210P, manufactured by Oomiya Kasei Corporation). Then, the cured anisotropic conductive film attached to the glass epoxy substrate was scraped off with a cotton swab soaked in acetone until there was none left. The number of scrapings was counted. As a result, the same results as in Example 2 were obtained.

Example 4

An anisotropic conductive film was obtained by repeating the same operations of Example 2. The obtained anisotropic conductive film was sandwiched between the copper pattern of a glass epoxy circuit board on which a copper pattern terminal was provided and the copper foil pattern terminal of a polyimide flexible substrate formed with a copper foil pattern terminal, and then compression-bonded for 10 seconds at a pressure of 40 MPa at 190° C. to obtain a layered connecting body.

Next, the flexible substrate was peeled by hand from the glass epoxy substrate of the obtained layered connecting body. A few drops of a sulfonium salt solution (Sunaid SI80L, manufactured by Sanshin Chemical Industry Co., Ltd.) were coated using a dropper on the cured anisotropic conductive film attached to the glass epoxy substrate, and the film was irradiated with ultraviolet rays (40 mJ) of a high-pressure mercury lamp (Curemax 210P, manufactured by Oomiya Kasei Corporation). Then, the cured anisotropic conductive film attached to the glass epoxy substrate was scraped off with a cotton swab soaked in acetone until there was none left. The number of scrapings was counted. The obtained results are shown in Table 1.

Example 5

An anisotropic conductive film was obtained by repeating the same operations of Example 2. The obtained anisotropic conductive film was sandwiched between the copper pattern of a glass epoxy circuit board on which a copper pattern terminal was provided and the copper foil pattern terminal of a polyimide flexible substrate formed with a copper foil pattern terminal, and then compression-bonded for 10 seconds at a pressure of 40 MPa at 190° C. to obtain a layered connecting body.

Next, the flexible substrate was peeled by hand from the glass epoxy substrate of the obtained layered connecting body. A small amount of N,N-dimethylacetamide was coated using a dropper on the cured anisotropic conductive film attached to the glass epoxy substrate, and the film was irradiated with ultraviolet rays (40 mJ) of a high-pressure mercury lamp (Curemax 210P, manufactured by Oomiya Kasei Corporation). Then, the cured anisotropic conductive film attached to the glass epoxy substrate was scraped off with a cotton swab soaked in acetone until there was none left. The number of scrapings was counted. The obtained results are shown in Table 1.

Comparative Example 1

An anisotropic conductive film and a layered connecting body were obtained by repeating the same operations of Example 1, except that a photoradical generator was not used. Furthermore, the cured anisotropic conductive film was irradiated with ultraviolet rays (40 mJ) of high-pressure mercury lamp (Curemax 210P, manufactured by Oomiya Kasei Corporation) from the glass substrate side of the obtained layered connecting body. Then, the flexible substrate was peeled by hand from the glass substrate, and cured anisotropic conductive film attached to the glass substrate was scraped off with a cotton swab soaked in acetone until there was none left. The number of scrapings was counted. The obtained results are shown in Table 1.

Comparative Example 2

An anisotropic conductive film and a layered connecting body were obtained by repeating the same operations of Example 2, except that a photoradical generator was not used. Furthermore, the cured anisotropic conductive film was irradiated with ultraviolet rays (40 mJ) of a high-pressure mercury lamp (Curemax 210P, manufactured by Oomiya Kasei Corporation) from the glass substrate side of the obtained layered connecting body. Then, the flexible substrate was peeled by hand from the glass substrate, and cured anisotropic conductive film attached to the glass substrate was scraped off with a cotton swab soaked in acetone until there was none left. The number of scrapings was counted. The obtained results are shown in Table 1.

TABLE 1

| Item | Example 1 | Example 2 | Example 4 | Example 5 | Comparative Example 1 | Comparative Example 2 |
| --- | --- | --- | --- | --- | --- | --- |
| Number of scrapings (average of 5 times) | 20 | 19 | 8 | 2 | 31 | 30 |

From Table 1, it can be seen that the anisotropic conductive film of the examples blended with a photoradical generator clearly has superior repair properties compared with the comparative examples. Regarding the effects of the photoradical generator, the anisotropic conductive film of Example 2 was subjected to thermal curing, irradiated with ultraviolet rays and then the Tg (tan δ peak) was measured under conditions of 1 Hz using a dynamic viscoelasticity analyzer (DMS 6100, manufactured by Seiko Instruments Inc.). The obtained results showed that Tg was, 131° C. prior to irradiation, 128° C. at an irradiation of 40 mJ, and 124° C. at an irradiation of 400 mJ. From these results, a clear decrease in Tg from ultraviolet ray irradiation was observed. Therefore, it can be seen that cleavage of the molecular chain from ultraviolet ray irradiation was occurring.

INDUSTRIAL APPLICABILITY

Since the thermosetting adhesive according to the present invention contains a photoradical generator in addition to a thermosetting insulating adhesive component, if the thermal-cured thermosetting adhesive irradiated with active energy rays, cleavage of the molecular chain occurs. Therefore, the adhesive dissolves or swells more easily in the solvent, and as a result repair properties are improved, which is useful in the production of connecting structures which use expensive substrates or electronic components.

What is claimed is:

1. A thermosetting adhesive comprising:
    a thermosetting insulating adhesive component, the thermosetting insulating adhesive component including:
        an epoxy resin and/or a phenoxy resin as a resin; and
        an imidazole-type latent curing agent and/or an amine-type latent curing agent as a thermal curing agent; and
    a photoradical generator that generates radicals due to irradiation of active energy rays, wherein
        the resin is thermally curable by the latent curing agent to generate a cured matter containing a polymer, and
        the generated radicals cause a molecular cleavage reaction of the polymer in the cured matter.

2. The thermosetting adhesive according to claim 1, wherein an amount of the photoradical generator is in a range of from 0.001 wt. % to 20 wt. %.

3. The thermosetting adhesive according to claim 1, further comprising conductive particles for anisotropic conductive adhesion.

4. The thermosetting adhesive according to claim 1, wherein the photoradical generator is a benzyldimethylketal compound, an α-hydroxy ketone compound, a bisacylphosphine oxide compound, or an α-amino ketone compound.

5. The thermosetting adhesive according to claim 4, wherein the photodradial generator is 2,2-dimethoxy-1,2-diphenylethan-1-one.

6. The thermosetting adhesive according to claim 4, wherein the photoradical generator is 1-hydroxy-cyclohexyl-phenyl ketone or 2-hydroxy-2-methyl-1-phenyl-propan-1-one.

7. The thermosetting adhesive according to claim 4, wherein the photoradical generator is bis(2,4,6-trimethylbenzoyl)-phenylphosphine oxide.

8. The thermosetting adhesive according to claim 4, wherein the photoradical generator is 2-benzyl-2-dimethylamino-1-(4-morpholinophenyl)-butan-1-one or 2-methyl-1-[4-(methylthio)phenyl]-2-morpholinopropan-1-one.

9. A connected structure, comprising:
    a first substrate in which an IC or a first electrode pattern is formed; and
    a second substrate in which a second electrode pattern is formed,
        wherein the first substrate and the second substrate are connected with the thermosetting adhesive according to claim 1.

* * * * *